(12) United States Patent
Atkins et al.

(10) Patent No.: US 10,764,029 B1
(45) Date of Patent: *Sep. 1, 2020

(54) ASYMMETRIC ENCRYPTION ALGORITHM (71) Applicants: Carey Patrick Atkins, Danvers, MA (US); Francesco Lucente Stabile, Winthrop, MA (US)

(72) Inventors: Carey Patrick Atkins, Danvers, MA (US); Francesco Lucente Stabile, Winthrop, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,304

(22) Filed: May 6, 2019

Related U.S. Application Data (63) Continuation of application No. 16/372,557, filed on Apr. 2, 2019.

(51) Int. Cl.
*H04L 9/06* (2006.01)
*G09C 1/00* (2006.01)

(52) U.S. Cl.
CPC ............. *H04L 9/0618* (2013.01); *G09C 1/00* (2013.01)

(58) Field of Classification Search
CPC .......... H04L 9/0618; H04L 63/00; G09C 1/00
See application file for complete search history.

(56) References Cited

U.S. PATENT DOCUMENTS

| | | | |
|---|---|---|---|
| 8,412,157 B2 | 4/2013 | Wang et al. | |
| 8,553,878 B2 | 10/2013 | Farrugia et al. | |
| 9,281,941 B2 * | 3/2016 | Gentry | H04L 9/008 |
| 9,922,174 B2 * | 3/2018 | Bain | G06F 21/6209 |
| 9,973,535 B2 * | 5/2018 | Maher | H04W 12/003 |
| 10,169,587 B1 * | 1/2019 | Nix | H04W 4/60 |
| 10,476,847 B1 * | 11/2019 | Smith | H04L 63/102 |
| 2005/0097362 A1 | 5/2005 | Winget et al. | |
| 2006/0140401 A1 * | 6/2006 | Johnson | G06F 21/14 380/44 |
| 2006/0285682 A1 * | 12/2006 | Sarangarajan | H04L 9/003 380/28 |
| 2007/0297367 A1 * | 12/2007 | Wang | H04L 63/0414 370/331 |
| 2011/0246787 A1 * | 10/2011 | Farrugia | G06F 21/60 713/189 |
| 2012/0079281 A1 * | 3/2012 | Lowenstein | G06F 21/602 713/189 |
| 2013/0061061 A1 * | 3/2013 | Farrugia | G09C 1/00 713/190 |

(Continued)

FOREIGN PATENT DOCUMENTS

| | | |
|---|---|---|
| CA | 2803419 A1 | 1/2012 |
| CN | 1625096 A | 6/2005 |

(Continued)

*Primary Examiner* — Joseph P Hirl
*Assistant Examiner* — Stephen T Gundry
(74) *Attorney, Agent, or Firm* — David Postolski (57) ABSTRACT

A method of asymmetrical encryption and transferring encrypted data is provided that incorporates the Lucente Stabile Atkins Cryptosystem ("LSA" algorithm). This algorithm uses certain properties of mathematical objects called "groups". Groups are sets of elements that are equipped with an operator and have the closure, associativity, identity, and invertibility properties. The LSA algorithm uses groups to encrypt and decrypt (secret sharing) any kind of symbolic information between two or more parties.

3 Claims, 2 Drawing Sheets

(56) References Cited

U.S. PATENT DOCUMENTS

| | | | |
|---|---|---|---|
| 2013/0106655 A1 | 5/2013 | Pujante Cuadrupani | |
| 2014/0331043 A1 | 11/2014 | Cho et al. | |
| 2015/0067874 A1* | 3/2015 | Johnson | G06F 21/14 |
| | | | 726/26 |
| 2016/0134593 A1* | 5/2016 | Gvili | H04L 63/10 |
| | | | 713/170 |
| 2016/0335420 A1* | 11/2016 | Bain | G06F 21/6209 |
| 2017/0063534 A1* | 3/2017 | Brown | H04L 9/3006 |
| 2017/0068804 A1 | 3/2017 | Wichmann et al. | |
| 2017/0177449 A1* | 6/2017 | Bronk | G06F 11/1464 |
| 2017/0324704 A1* | 11/2017 | Wood | H04L 63/10 |
| 2018/0006829 A1* | 1/2018 | Kravitz | H04L 9/3268 |
| 2018/0035297 A1* | 2/2018 | Cronin | H04L 63/105 |
| 2018/0091301 A1 | 3/2018 | Nunez et al. | |
| 2018/0139184 A1* | 5/2018 | Andersson | H04L 9/14 |
| 2018/0191695 A1* | 7/2018 | Lindemann | H04L 63/0853 |
| 2018/0337953 A1* | 11/2018 | Maher | H04L 63/20 |
| 2019/0068372 A1* | 2/2019 | Bhatnagar | H04L 63/045 |
| 2019/0068567 A1* | 2/2019 | Bhatnagar | H04L 9/0833 |
| 2019/0068614 A1* | 2/2019 | Bhatnagar | H04L 51/14 |
| 2019/0068746 A1* | 2/2019 | Bhatnagar | H04L 63/104 |
| 2019/0223008 A1* | 7/2019 | Vanderveen | B64C 39/024 |
| 2019/0268149 A1* | 8/2019 | Kariv | H04L 9/0897 |
| 2019/0268312 A1* | 8/2019 | Ma | H04L 9/3239 |
| 2019/0296919 A1* | 9/2019 | Kravitz | H04W 12/08 |
| 2019/0332774 A1* | 10/2019 | Nix | G06F 21/6218 |
| 2020/0012527 A1* | 1/2020 | Hartsock | H04L 9/3247 |
| 2020/0014538 A1* | 1/2020 | Liu | H04L 9/0822 |
| 2020/0120074 A1* | 4/2020 | Ma | H04L 63/123 |

FOREIGN PATENT DOCUMENTS

| | | |
|---|---|---|
| CN | 101473668 B | 10/2011 |
| CN | 102271330 A | 12/2011 |
| CN | 104852961 A | 8/2015 |
| CN | 107147626 A | 9/2017 |
| CN | 107493165 A | 12/2017 |
| CN | 107770127 A | 3/2018 |
| CN | 108809653 B | 7/2019 |
| FR | 2978851 A1 | 2/2013 |
| KR | 1020040052304 A | 3/2005 |
| WO | 2008005162 A2 | 1/2008 |
| WO | 2012003998 A1 | 1/2012 |
| WO | 2018102382 A1 | 6/2018 |
| WO | 2018126858 A1 | 7/2018 |

* cited by examiner

FIG. 1

$U(n) - \langle a^0, a^1, a^2, \ldots, a^{\varphi(n)-1}\rangle = \langle \varepsilon_1, \varepsilon_2, \varepsilon_3, \ldots, \varepsilon_{\varphi(n)}\rangle.$ Note that the notation $a^1$ is not necessarily ordered, while the notation $\varepsilon_j$ instead implies that the elements are ordered in an ascending order, meaning that $\varepsilon_j < \varepsilon_k$, when $j < k$.

Then, $c \cdot \text{Remaining block} \equiv -1 \bmod n$

ASYMMETRIC ENCRYPTION ALGORITHM

CLAIM OF PRIORITY

This application is a United States Non-Provisional Patent Application and claims priority to U.S. patent application Ser. No. 16/372,557, filed Apr. 2, 2019, herein incorporated by reference in its entirety.

FIELD OF THE EMBODIMENTS

This invention relates to encryption algorithms and, in particular, to an asymmetric encryption algorithm that follows Kerckhoff's principle that is not susceptible to the prime factorization problem.

BACKGROUND OF THE EMBODIMENTS

Multiple prior encryption algorithms have been published. These are different from the Lucente Stabile Atkins algorithm of the present invention (hereinafter referred to as the "LSA" Algorithm). Examples of related art are described below:

French patent publication no. FR2978851A1 generally describes an algorithm that is used to encrypt pin numbers using the four digits of a 24 hour clock. While modular arithmetic is used, Gauss's Generalization of 'Wilson's Theorem is not employed in this method. And, unlike the LSA algorithm, there is also no key exchange needed for this type of cryptography.

Korean patent publication no. KR1020040052304A generally relates to hardware and employs Blockchain technology as a method for securing a digital hardware system, which is provided to encrypt/decrypt data. This method uses an exclusive binary operator and a similar random number generator and combines parts of existing algorithms such as AES and ElGamal. Gauss's Generalization of Wilson's Theorem is not used.

U.S. Pat. No. 8,412,157B2, International publication No. WO2008/00516282, and U.S. Patent Publication No. US2007/0297367A1 generally relate to hardware that uses the discrete logarithm problem to hide information. While there is a key exchange required for this algorithm, there is no use of the multiplicative cyclic groups. This means that Gauss's Generalization of Wilson's Theorem is not employed in these methods.

U.S. Pat. No. 8,553,878B2 uses a similar property of group theory in that it employs some of the properties of multiplicative groups. But, unlike the LSA algorithm, the multiplicative groups must be of prime order and the elements are specifically used to modify ElGamal. There is no use of Gauss's Generalization of Wilson's Theorem in this patent.

In U.S. Patent Publication No. US20050097362A1, the Diffie-Hellman key exchange is used to verify zero knowledge protocols. Additionally, this algorithm uses existing algorithms AES, RSA, and SHA to protect credentials. There is no use of Gauss's Generalization of Wilson's Theorem in this patent.

U.S. Patent Publication No. US2013/0106655A1 generally uses existing algorithms ElGamal, RSA, and Diffie-Hellman to encrypt and pad information for various types of navigation receivers. It does not make use of Gauss's Generalization of Wilson's Theorem.

Korean Patent Publication No. KR120040052304A generally relates to a digital hardware system that uses RSA and elliptic curve cryptography. The main purpose is to encrypt data and reinforce digital hardware systems. There is no use of Gauss's Generalization of Wilson's Theorem in this patent.

Chinese Patent Publication No. CN102271330A uses RSA, elliptic curves, Diffie-Hellman, and ElGamal to encrypt data terminals such as network servers. There is no use of Gauss's Generalization of Wilson's Theorem in this patent.

International Patent Publication No. WO2012003998A1 and Canadian Patent Publication No. CA2803419A1 generally relate to devices and networks that use the RSA algorithm to authenticate the position of a Global Positioning Satellite receiver. The method of encryption makes no use of Gauss's Generalization of Wilson's Theorem.

French Patent Publication No. FR2978851A1 generally describes a method used to authenticate users of a service by letting the user personalize the techniques of their authentication. This makes no use of any algorithms analogous to the LSA algorithm or multiplicative groups.

Chinese Patent Publication No. CN104852961A generally describes a symmetric algorithm that employs block ciphers to transmit data between devices. Specifically, RSA, DES, 3DES, AES, and various hash functions are used to encrypt blocks of data. There is no use of Gauss's Generalization of Wilson's Theorem or anything that could be considered analogous to the LSA algorithm.

International Patent Publication No. WO2018126858A1 uses existing blockchain technology in conjunction with RSA, ElGamal, Diffie-Hellman, and elliptic curve encryption algorithms to verify ATM transactions. There is no use of Gauss's Generalization of Wilson's Theorem.

Chinese Patent Publication No. CN107147626A generally describes an encryption algorithm that combines existing AES and ElGamal to create a new asymmetric algorithm. There is essentially no new theorems used in this encryption scheme and no employment of Gauss's Generalization of Wilson's Theorem.

Chinese Patent Publication No. CN107493165A generally describes key sharing that uses Diffie-Hellman, Hash function, and time stamps to verify key exchange and verification with increased anonymity. This is not intended for general chosen symbolic encryption. There is no use of Gauss's Generalization of Wilson's Theorem.

Chinese Patent Publication No. CN1077701278 generally describes a method of data transmission (and device) that combines symmetric and asymmetric encryption algorithms such as DES, 3DES, RC5, IDEA, RSA, ElGamal, knapsack, and Rabin algorithms. There is no use of Gauss's Generalization of Wilson's Theorem.

International Patent Publication No. WO2018102382A1 uses pre-existing algorithms such as Diffie-Hellman, ElGamal, and elliptic curves to hide public keys in the ciphertext of an encrypted message. There is no use of Gauss's Generalization of Wilson's Theorem.

International Patent Publication No. WO2008005162A2 and Chinese Patent Publication No. CN101473668A describe methods that further protect identities during initial communication such as during the key exchange. There is no invention of a new encryption algorithm but instead that uses various pre-existing algorithms such as ElGamal and DH. There is no use of Gauss's Generalization of Wilson's Theorem.

Chinese Patent Publication No. CN108809653A generally describes a method to ensure that previously encrypted ciphertext is indeed encrypted such that it can be verified by all parties along with original hardware and manufacturing techniques. This method makes use of multiplicative groups but does not incorporate any use of Gauss's Generalization of Wilson's Theorem.

Chinese Patent Publication No. CN1625096A generally describes a method for masking data in a PDF. There is no use of Gauss's Generalization of Wilson's Theorem or anything analogous to the LSA algorithm.

None of the art described above addresses all of the issues that the present invention does.

SUMMARY OF THE EMBODIMENTS

According to an aspect of the present invention, a method of asymmetrical encryption and transferring encrypted data is provided. The method includes generating an encryption key represented by k∈Z, calculating an n that satisfies the following properties:
  i) $k<n$;
  ii) $n=p^t$, $n=2 \cdot p^t$ where p is an odd prime number and $t \in Z$ is a non-negative integer; and
  iii) For any $\beta \in Z$ that satisfies I) and II) it must be the case that $n \leq \beta$,
    wherein, if these properties have been met, U(n) is defined as a cyclic
  group of all integers relatively prime to n and less than n, and
    wherein U(n) is cyclic and $U(n)=<a>=(\{a^0, a^1, a^2, \ldots, a^{\varphi(n)-1}\}$;
  choosing an element, $a^l$, with $0 \leq l \leq \varphi(n)-1$ such that $U(n)=<a>=\{a^0, a^1, a^2, \ldots, a^{\varphi(n)-1}\}=(\{\varepsilon_1, \varepsilon_2, \varepsilon_3, \ldots, \varepsilon_h, \ldots \varepsilon_{\varphi(n)}\}$,
  wherein $\varepsilon_i < \varepsilon_j$ when $i<j$, to represent a plaintext of a selection of data, and
  wherein $a^l = \varepsilon_h$;
  encrypting the selection of data by performing the following steps:
    a) multiplying all elements $\varepsilon_1, \varepsilon_2, \varepsilon_3, \ldots, \varepsilon_h$ mod $n \equiv c$, where c is a component of a ciphertext;
    b) analyzing data to determine when $c \cdot \varepsilon_{\varphi(n)} \equiv -1$ mod n, $c \cdot \varepsilon_{\varphi(n)} \cdot \varepsilon_{\varphi(n)-1} \equiv -1$ mod n, all the way to $c \cdot \varepsilon_{\varphi(n)} \cdot \varepsilon_{\varphi(n)-1} \cdots \varepsilon_{h+1} \equiv -1$ mod n;
    c) recording a number of instances where step a) is true, wherein the number of instances is defined as Σ; and
    d) generating a ciphertext, defined as C, wherein C=(c, Σ);
  sending C to one or more third parties; and
  decrypting the ciphertext using the encryption key.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The present invention describes a cryptosystem, which is a systematic, unique, and non-obvious method to encrypt and decrypt messages, derived by a theorem. The present method may be used in multiple real-world applications, and can be used, e.g., to keep chosen information hidden revealed only to a chosen party. Although the present invention has multiple used, the primary application is a method of encryption, thereby creating a means of secretly sharing information between two or more parties.

The present invention is an improvement upon the existing technologies for a number of reasons. For example, the present invention is less computationally intensive for computers and more secure since incorporated within is a known, proven theorem. The present invention may further be used in fields such as quantum cryptography because current encryption algorithms will no longer work with quantum computers, and emails as well as all other online transactions will likely be completely unencrypt-able once quantum computers are operational. This lack of protection in the age of quantum computing may prove to be devastating for e-commerce, finance, and/or other fields.

The Lucente Stabile Atkins Cryptosystem algorithm (hereinafter the "LSA" algorithm) of the present invention is an asymmetric encryption algorithm that follows Kerckhoffs's principle and is novel in the field of cryptography. This algorithm uses certain properties of mathematical objects called "groups". Groups are sets of elements that are equipped with an operator and have closure, associativity, identity, and invertibility properties. According to an embodiment, the present invention incorporates the LSA algorithm, using groups to encrypt and decrypt (secret sharing) any kind of symbolic information between two or more parties. The U(n) group, which is the set of all the integers coprime to n and less then n, closed under multiplication modulo n, is used for its closure property. The closure property guarantees that, whenever elements of the group are operated upon each other, the resulting element is itself a member of the group. This happens due to the existence of a unique element called the identity element. The identity element is an element, e, such that, for each element a of the group, ea≡a(mod n) and ae≡a(mod n). Moreover, each element of a group has a unique inverse such that, for each element a in the group U(n), there exists an element b, where a operated with b generates the identity e, which, in the case of multiplicative groups means ab≡1 (mod n).

According to an embodiment, an additive group, called $Z_n$ (which is the set of all the integers less than in, closed under addition modulo n) can also be used for the properties mentioned above, with the difference being that the identity element is 0, and that the group is equipped with the operation addition modulo n. A fundamental role for the information sharing is played by a specific case of the mathematical theorem, called "Gauss's Generalization Of Wilson's Theorem" (a proof of which is given below). This theorem guarantees that, by operating the elements in a certain way, the parties that share information can expect to find common elements, congruent to 1 or −1 modulo n, to every group that can be used as a particular reference.

Use of the LSA algorithm is virtually unlimited in the field of cryptography since it allows multiple parties to share as little as one element at a time, thus making the use of the LSA algorithm an improvement upon the existing cryptographical technologies. This can be priceless in fields like finance and banking where account information and credit card information are exchanged, in the open, millions of times per day. Each ATM, ecommerce, and money wiring transaction would benefit from use of the LSA algorithm as it is less computationally intensive than current asymmetric algorithms as smaller numbers are used to compute, enabling cheaper systems to be able to perform the cryptography, thus saving users money. According to an embodiment, the LSA algorithm may be used on any suitable electronic device have a process and/or a memory. The electronic device may be, e.g., a desktop computer, a laptop computer, a smartphone, a tablet computer, an automated teller machine, and/or any other suitable electronic device.

Furthermore, every business that benefits from online retail will benefit from the increased security and decrease energy demand. The organizations that stand to benefit the most from increased security and decreased energy consumption are government and military organizations that need to store and share large amounts of classified information. Furthermore, each individual that uses current communication technology will benefit from increased security in phone calls, sms, mms, apps, emails, chats, sharing of sensitive data like Social Security Numbers, and any symbolic documents, as well as encryption of personal codes and passwords According to an embodiment, the present invention incorporates the LSA algorithm into a cryptographic method. According to an embodiment, the method functions when two parties know a key (commonly a number) and keep it secret. From the key, the parties independently generate the same integer, herein referred to as n, that will be used to generate and list the group $U(n)$ or $Z_n$ and its elements. In the case that the group $U(n)$ is used, the sender, after having listed and ordered in ascending order (or descending, as long as both parties agree) the elements of the group, chooses a specific element, say m, which represents the plaintext. The sender multiplies all the elements from the smallest to m (included) and sends the product modulo n, call it c, publicly to the receiver. The receiver reads c as ciphertext and, to decrypt, multiplies all the elements of the group in ascending order, checking each time that he multiplies an element to the previous partial product, if the element generated is congruent to c modulo n. When he finds an element congruent to c modulo n, he knows that the last multiplied integer is m, then the receiver knows that m is the plaintext.

Since the group elements are closed under multiplication, then it is possible that, during the process, the integer c is generated more than once. The sender records the number of times this happens, herein referred to as E, and sends the receiver the ordered pair (c, Σ) publicly. Hence, when the receiver has generated the element, c, Σ+1 times, he knows that the last element multiplied is indeed m.

Similarly, for the group $Z_n$, the process is identical, where the only difference is that addition modulo n is used instead of multiplication modulo n.

Additionally, according to an embodiment of the present invention, the LSA algorithm can be used pairing the Gauss' Generalization of Wilson's Theorem with the multiplication modulo n, while operating within the group U(n). In this case, n must be chosen conscious of whether U(n) is cyclic or not. If U(n) is cyclic, after the sender and the receiver have listed and ordered the group elements in ascending order (or descending, as long as the two parties agree beforehand), the sender chooses the plaintext m and sends the products modulo n (herein referred to as c), of all the elements of the group from the smallest to m (included). The multiplication of the elements might generate more than one element congruent to −1 modulo n. The sender will record all the instances that this happens, call it Σ. She will then send (c, Σ) publicly to the receiver. Since the group is cyclic, the receiver knows that all the elements multiplied together generate an element congruent to −1 modulo n. Then, the receiver multiplies the elements of the group, starting with the largest and multiplying in descending order with c, and checks to see if it's congruent to −1 modulo n each time. When he finds elements congruent to −1 modulo n, Σ+1 times, he knows that all of the elements of the groups have been multiplied, so the next element of the list in descending order, yet to be multiplied, is the plaintext m. In case that U(n) is not cyclic, the multiplication of all the elements of the groups generates an element congruent to 1 modulo n. Therefore, the sender and the receiver will operate in the same way described above for when the group is cyclic, but using congruence to 1 modulo n instead of −1 modulo n.

The following is a claim and proof, showing a specific case of Gauss's Generalization of Wilson's Theorem, of which a proof is provided below and can be considered a mathematical lemma for the algorithm of the present invention (herein referred to as the "LSA algorithm").

Claim:

Let $U(n)=\langle a \rangle$ be a cyclic group of all the integers coprime to n and less then in. Assume that the group is generated by the element a, then $a \cdot a^2 \cdot a^3 \ldots a^{\varphi(n)-1} \equiv -1 \bmod n$.

Proof:

Let $U(n)=\langle a \rangle$ be a cyclic group of integers coprime to n and less then in, so that $U(n)=\langle a \rangle=\langle 1, a, a^2, a^3 \ldots, a^{\varphi(n)-1} \rangle$, and that $\gcd(a^j,n)=1$ for all $j \in Z$.

First observe that $n-1 \equiv -1 \bmod n$ and that $(n-1)^2 = n(n-2)+1 \equiv 1 \bmod n$. It follows that n−1 is its own inverse.

Moreover, n−1 is the only non-identity element of the group whose inverse is itself. In fact let b be an arbitrary element of U(n), such that $b^2 \equiv 1 \bmod n$, it follows that $b^2-1 \equiv 0 \bmod n$. This means that n|(b−1) or n|(b+1). Now, if b≠1, and b≠(n−1), then 3≤b+1≤n−1, and 1≤b−1≤n−3. Note that no integer in the group between 1 and n−1 is divisible by n, hence this such element b does not exist.

Now, since U(n) is a group, then each element of U(n) has a unique and distinct inverse that can be found between the elements of the group, except for n−1. Thus $(a^i)(a_i)^{-1} \equiv 1 \bmod n$, where $a^i$ and $(a^i)^{-1}$ are distinct elements, for all i≠0, except for an integer 1 for which $n-1=a^l$.

So consider $1 \cdot a \cdot a^2 \cdot a^3 \ldots a^l \ldots a^{\varphi(n)-1}$.

It is known that each element multiplied with its own unique and distinct inverse generates an element that is congruent to 1 modulo n, except for $a^l$.

Figure 1:
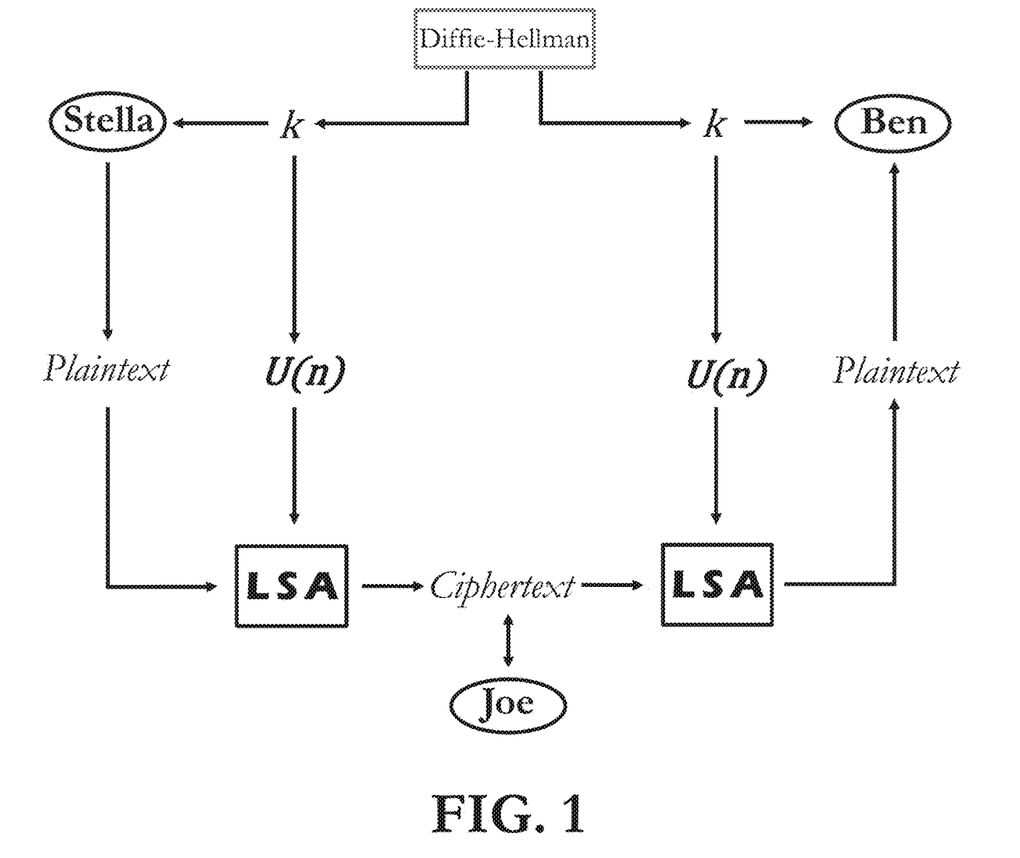
FIG. 1 shows a visual representation of the functioning of the LSA algorithm, according to an embodiment of the present invention.

So we have that $1 \cdot a \cdot a^2 \ldots a^l \ldots a^{\varphi(n)-1} \equiv 1 \cdot aa^{-1} \ldots a^l \ldots a^{\varphi(n)-1}(a^{\varphi(n)-1})^{-1}$ $\equiv 1 \cdot 1 \cdot 1 \ldots -1 \ldots 1$ $\equiv -1 \bmod n.$ A schematic diagram of the LSA algorithm is shown in FIG. 1.

Once the key exchange algorithm (The Diffie Hellman for example, as shown in FIG. 1) produces an integer known only to two individuals (e.g., Stella and Ben in FIG. 1), the group U(n) is generated and the LSA algorithm then functions.

According to an embodiment, Stella runs her plaintext into the LSA algorithm and a ciphertext is generated and made public (to everyone and consequently to a third party, e.g., Joe). Note that only where Joe is located the shared information is public. Everywhere else, everything is secret. According to an embodiment, Ben receives the ciphertext and runs it in the LSA algorithm, which decrypts it and delivers Ben the plaintext, secretly.

An example of the use of the present invention is thus provided. According to the following example, a scenario is described in which two parties desire to secretly exchange information symbolically (numerically, alphabetically, etc.). As is customary in the field of cryptography, arbitrary names are chosen for the sender and receiver of the message, along with a third party of whom the contents of the message will be kept secret.

Assume Stella wishes to send a message to Ben, and Stella further wishes that the contents of the message are to remain hidden from Joe. They perform the following steps:

1. Stella and Ben begin by performing a key exchange such as the Diffie-Hellman key exchange. This generates a shared key, $k \in Z$, that is only known to Stella and Ben and is kept secret.

2. Next, k will be used as a reference by both parties to independently find an integer n. Here, an example is provided of how to generate, favorably, n from k:

Choose n that satisfies the following properties:
  I) k<n.
  II) $n=p^t$, $n=2 \cdot p^t$ where p is an odd prime number and $t \in Z$ is a non-negative integer.
  III) For any $\beta \in Z$ that satisfies I) and II) it must be the case that $n \leq \beta$.

3. Assuming that the above conditions have been met, then it follows that U(n) is a cyclic group of all of the integers relatively prime to n and less than n. Since U(n) is cyclic then $U(n)<a>=\{a^0, a^1, a^2, \ldots, a^{\varphi(n)-1}\}$. At this point, Stella chooses an element $a^l$ with $0 \leq l \leq \varphi(n)-1$ such that $U(n)=<a>=\{a^0, a^1, a^2, \ldots, a^l, \ldots, a^{\varphi(n)-1}\}=\{\varepsilon_1, \varepsilon_2, \varepsilon_3, \ldots, \varepsilon_h, \ldots, \varepsilon_{\varphi(n)}\}$ where $\varepsilon_i < \varepsilon_j$ when i<j, to represent the plain text of her message, where $a^l = \varepsilon_h$. Note that since k is only known to Stella and Ben, and U(n) is chosen from the shared knowledge of k, then U(n) is only known to Stella and Ben.

4. To encrypt, Stella multiplies all of the elements $\varepsilon_1 \cdot \varepsilon_2 \ldots, \varepsilon_h$ mod $n \equiv c$ where c is a component of the ciphertext. Then Stella checks if $c \cdot \varepsilon_{\varphi(n)} \equiv -1$ mod n, $c \cdot \varepsilon_{\varphi(n)} \cdot \varepsilon_{\varphi(n)-1} \equiv -1$ mod n, all the way to $c \cdot \varepsilon_{\varphi(n)} \cdot \varepsilon_{\varphi(n)-1} \ldots \varepsilon_{h+1} \equiv -1$ mod n and records the number of instances where this is true. She gives this value a name, say $\Sigma$, and $C=(c,\Sigma)$ becomes the ciphertext.

5. Stella publicly sends C to Ben.

6. Since U(n) is cyclic, Ben checks if $c \cdot \varepsilon_{\varphi(n)} \equiv -1$ mod n, $c \cdot \varepsilon_{\varphi(n)} \cdot \varepsilon_{\varphi(n)-1} \equiv -1$ mod n, all the way to $c \cdot \varepsilon_{\varphi(n)} \cdot \varepsilon_{\varphi(n)-1} \ldots \varepsilon_{h+1} \equiv -1$ mod n until he finds $\Sigma+1$ elements congruent to $-1$ modulo n. When $c \cdot \varepsilon_{\varphi(n)} \cdot \varepsilon_{\varphi(n)-1} \ldots \varepsilon_{h+1} \equiv -1$ mod n Ben knows $c = a^l = \varepsilon_h$.

7. Stella repeats the algorithm for each plaintext symbol of her message.

According to the following example, the LSA algorithm being operated within a cyclic group U(n) is shown, where the choice of n is the one suggested above, in point 2. Note that, in the present example, a group of small order is chosen as to make the computations manageable. Consider the case where Stella wants to secretly share the plaintext '7' with Ben:

1. The key exchange generates k=53.

2. Stella and Ben independently follow the LSA algorithm and conclude that the next useful integer is 54 because 54 satisfies the following properties: 53<54 and $54=2 \cdot 3^3$.

3. Stella and Ben list the elements $U(54)=\{1,5,7,11,13,17,19,23,25,29,31,35,37,41,43,47,49,53\}$.

4. Since Stella wishes to send '7', she picks the 7th element of U(54) in ascending order, which is 19. Then she performs $1 \cdot 5 \cdot 7 \cdot 11 \cdot 13 \cdot 17 \cdot 19 = 1,616,615$ mod $54 \equiv 17 = c$.

5. Stella multiplies c by each element in descending order to find the value of $\Sigma$ in the following way:

$17 \cdot 53 = 901$ mod $54 \equiv 37$
$37 \cdot 42 = 1,813$ mod $54 \equiv 31$
$31 \cdot 47 = 1,457$ mod $54 \equiv 53 \rightarrow \equiv -1$ mod $54 \rightarrow$ (this is one $\Sigma$)
$53 \cdot 43 = 2,279$ mod $54 \equiv 11$
$11 \cdot 41 = 451$ mod $54 \equiv 19$
$19 \cdot 37 = 703$ mod $54 \equiv 1$
$1 \cdot 35 = 35$ mod $54 \equiv 35$
$35 \cdot 31 = 1,085$ mod $54 \equiv 5$
$5 \cdot 29 = 145$ mod $54 \equiv 37$
$37 \cdot 25 = 925$ mod $54 \equiv 7$ 6. Since c=17 and there is only one $\Sigma$, then Stella publicly sends C=(17,1) to Ben (assuming that no extra steps are taken to protect the value of $\Sigma$).

7. Ben receives C and starts to multiply c by the elements of the group in decending order until he finds $\Sigma+1$ (in this case 1+1) elements congruent to $-1$ mod 54 as follows:

$17 \cdot 53 = 901$ mod $54 \equiv 37$
$37 \cdot 42 = 1,813$ mod $54 \equiv 31$
$31 \cdot 47 = 1,457$ mod $54 \equiv 53 \rightarrow \equiv -1$ mod $54 \rightarrow$ (first $\Sigma$)
$53 \cdot 43 = 2,279$ mod $54 \equiv 11$
$11 \cdot 41 = 451$ mod $54 \equiv 19$
$19 \cdot 37 = 703$ mod $54 \equiv 1$
$1 \cdot 35 = 35$ mod $54 \equiv 35$
$35 \cdot 31 = 1,085$ mod $54 \equiv 5$
$5 \cdot 29 = 145$ mod $54 \equiv 37$
$37 \cdot 25 = 925$ mod $54 \equiv 7$
$7 \cdot 23 = 161$ mod $54 \equiv 53 \rightarrow$ (second $\Sigma$)

8. Since Ben found the second element that is congruent to $-1$ mod 54, he knows that all of the elements of the group have been multiplied. This tells him that the next number in the sequence is the chosen number (19). Since 19 is the 7th group element, Ben has the plaintext '7'.

Following the Gauss' Generalization of Wilson's Theorem for non-cyclic group, that states that, if all the elements of U(n) are multiplied, when U(n) is not cyclic, an element congruent to 1 modulo n can be generated, the LSA algorithm can be used in the following way:

1. Stella and Ben begin by performing a key exchange algorithm that generates the shared key $k \in N$ that is only known to Stella and Ben and is kept secret.

2. Next, k will be used as a reference by both parties to find an $n \in Z$ that satisfies the following suggested properties:
  I) k<n.
  II) $n \neq p^t$ and $n \neq 2 \cdot p^t$ where p is an odd prime number and $t \in N$ is an on-negative integer.
  III) For any $\beta \in Z$ that satisfies I) and II) it must be the case that $n \leq \beta$.

3. Assuming that the above conditions have been met, then it follows that U(n) is not cyclic. At this point, Stella chooses an element $\varepsilon_h$ such that $U(n)=\{\varepsilon_1, \varepsilon_2, \varepsilon_3, \ldots, \varepsilon_h, \ldots, \varepsilon_{\varphi(n)}\}$ where $\varepsilon_i < \varepsilon_j$ when i<j, to represent the plain text of her message.

4. To encrypt, Stella multiplies all the elements $\varepsilon_1 \cdot \varepsilon_2 \ldots \varepsilon_h$ mod $n \equiv c$, where c is a component of the ciphertext. Then Stella checks if $c \cdot \varepsilon_{\varphi(n)} \equiv 1$ mod n, $c \cdot \varepsilon_{\varphi(n)} \cdot \varepsilon_{\varphi(n)-1} \equiv 1$ mod n, all the way to $c \cdot \varepsilon_{\varphi(n)} \cdot \varepsilon_{\varphi(n)-1} \ldots \varepsilon_{h+1} \equiv 1$ mod n and records the number of instances where this is true. She gives this value a name, say $\Sigma$, and $C=(c,\Sigma)$ becomes the cyphertext.

5. Stella publicly sends C to Ben.

6. Since U(n) is not cyclic, Ben checks if $c \cdot \varepsilon_{\varphi(n)} \equiv 1$ mod n, $c \cdot \varepsilon_{\varphi(n)} \cdot \varepsilon_{\varphi(n)-1} \equiv 1$ mod n, all the way to $c \cdot \varepsilon_{\varphi(n)} \cdot \varepsilon_{\varphi(n)-1} \ldots$ $\varepsilon_{h+1} \equiv -1 \mod n$ until he finds $\Sigma+1$ elements congruent to 1 modulo n. When $c \cdot \varepsilon_{\varphi(n)} \cdot \varepsilon_{\varphi(n)-1} \ldots \varepsilon_{h+1} \equiv -1 \mod n$, Ben knows $c \equiv \varepsilon_h$ According to an embodiment, the LSA algorithm can be performed operating within additive groups in the following way:

1. Let the generated key k be used to generate $Z_k$, where $Z_n$, with $n \in Z_+$ is the group of the positive integers less than n including 0, closed under addition modulo n.

2. Then, Stella picks an element of the group, say l, according to her needs of information sharing, and sends $c \equiv 0+1+2+\ldots+l \mod k$ to Ben.

3. Ben decrypts the message by performing $0+1+2+\ldots+h$ until he finds that $0+1+2+\ldots h \equiv c \mod k$, thus he will know that h=l and the plaintext will be decrypted.

4. As in the multiplicative method, since $Z_k$ is a group, it is possible that the addition of the elements of the group will generate more than one element congruent to c modulo k, so, all of these elements will be listed as $\Sigma$ and communicated in a tuple such as $C=(c,\Sigma)$, where C will be public.

Computational Example

The key exchange generates the integer 5, thus Stella and Ben list the elements of $Z_5$ in ascending order, namely <0,1,2,3,4>.

Assume that Stella wants to send Ben the integer 3; then she performs $0+1+2+3=6 \equiv 1 \mod 5$, thus she find that c=1. Next, she will check that $0+1 \equiv 1 \mod 5 \rightarrow$ (this is one $\Sigma$)
$0+1+2 = 3 \equiv 3 \mod 5$.

At this point, she found the value of $\Sigma$ and she sends $C=(1,1)$ to Ben.

Ben then performs the same steps until he finds the second element congruent to 1 modulo 5, in the following way:

$0+1 \equiv 1 \mod 5 \rightarrow$ (one $\Sigma$)
$0+1+2 = 3 \equiv 3 \mod 5$
$0+1+2+3 = 6 \equiv 1 \mod 5$.

Thus, Ben knows that c=3 and he decrypts the cyphertext.

According to an embodiment, the LSA algorithm can be used in multiplicative groups U(n) in the following way:

1. Let the generated shared key k be used to generate $n \in Z_+$, then use n to generate $U(n) = <\varepsilon_1, \varepsilon_2, \varepsilon_3, \ldots, \varepsilon_{\varphi(n)}>$, that is the group of all the integers less then n and coprime to n, where $\varepsilon_i < \varepsilon_j$ when i<j.

2. Then, Stella picks an element of the group, say $\varepsilon_h$, according to her needs of information sharing, and sends c to Ben, such that $\varepsilon_1 \cdot \varepsilon_2 \ldots \varepsilon_h \mod n \equiv c$.

3. Ben decrypts the message by performing $\varepsilon_1 \cdot \varepsilon_2 \cdot \varepsilon_3 \ldots$ until he arrives to multiply $\varepsilon_h$ and finds that $\varepsilon_1 \cdot \varepsilon_2 \ldots \varepsilon_h \mod n \equiv c$, thus he will know that $\varepsilon_h$ is the plaintext.

4. Since U(n) is a group, it is possible that the multiplication of the elements of the group will generate more than one element congruent to c modulo n, so, all of these elements will be listed as E and communicated in a tuple such as $C=(c,\Sigma)$, where C will be public.

Computational Example

From the key exchange algorithm we generate k that we use in turn to obtain the integer 18, thus Stella and Ben list the elements of U(18) in ascending order, namely <1,5,7,11,13,17>. Assume that Stella wants to send Ben the integer 13; then she performs $1 \cdot 5 \cdot 7 \cdot 11 \cdot 13 = 5005 \equiv 1 \mod 18$, thus she find that c=1. Next, she will check that $1 \equiv 1 \mod 18 \rightarrow$ (this is one $\Sigma$)
$1 \cdot 5 \equiv 5 \mod 18$
$1 \cdot 5 \cdot 7 \equiv 17 \mod 18$
$1 \cdot 5 \cdot 7 \cdot 11 \equiv 7 \mod 18$ At this point she found the value of $\Sigma$ which is 1, and she sends $C=(1,1)$ to Ben.

Ben then performs the same steps until he finds the second element congruent to 1 modulo 18, in the following way:

$1 \equiv 1 \mod 18 \rightarrow$ (one $\Sigma$)
$1 \cdot 5 \equiv 5 \mod 18$
$1 \cdot 5 \cdot 7 \equiv 17 \mod 18$
$1 \cdot 5 \cdot 7 \cdot 11 \equiv 7 \mod 18$
$1 \cdot 5 \cdot 7 \cdot 11 \cdot 13 \equiv 1 \mod 18$ So, finally, Ben knows that the plaintext is 13 because he found the second element congruent to 1 modulo 18.

According to an embodiment, the LSA algorithm can be used as a combination of cyclic and non-cyclic groups.

After the key exchange process, we use the Gauss' Generalization of Wilson's Theorem accordingly to the nature of the key k. This means that if the key exchange algorithm generates $k \in Z$ such that $k=p^t$ or $k=2p^t$, with p be a prime number and $t \in Z$, then Stella and Ben will encrypt and decrypt the message accordingly to the method described for cyclic groups. If instead $k \neq p^t$ and $k \neq 2p^t$, then Stella and Ben will encrypt and decrypt accordingly to the method described for non-cyclic groups.

According to an embodiment, all of the variations of the LSA algorithm can be performed backwards, just by listing the elements in all the variation in descending order and then proceeding as described in each case.

In this section it will now be discussed how to map elements from group U(n) to a set of plaintext symbols P via a surjective function $\psi:U(n) \rightarrow P$.

The function $\psi$ must be surjective for each member of the codomain to have a preimage in U(n) in order to make sure each plaintext character is paired with a member of the group. This can be done by mapping the group elements from U(n) to P. In cases where the order of P is less than the order U(n), the elements can be mapped modulo the order of P. For example:

Assume P is the set of symbols {e,f,g}. Then, in U(9), for example, p maps the elements as follows:

e→1
f→2
g→4
e→5
f→7
g→8

Consider the above-mentioned example in which Stella wants to send the symbol f She can send this with either $1 \cdot 2 \mod 9 \equiv 2$ or $1 \cdot 2 \cdot 4 \cdot 5 \cdot 7 \mod 9 \equiv 1$. So she can send f as either c=1 or c=2 as the first component of C.

In the following section, encrypting $\Sigma$ for enhanced security is discussed.

Since the integer $\Sigma$ is sent publicly, Stella may wish to hide its value. One way this can be done is as follows:

1. Convert $\Sigma$ and k into binary and reduce the length of the binary string that represents $k_2$ to the exact length of the binary string that represents $\Sigma_2$. For convenience we will call this new value $k_2-m=y$ where m is the part of the binary string that differs in length between the string $k_2$ and $\Sigma_2$.

2. Stella then performs an XOR on $\Sigma_2$ and $y_2$ to get a new value $\Sigma_2 \oplus y_2 = x$.

3. Stella sends Ben $C=(c, x)$ publicly.

4. Additionally, Stella can use a secure hash algorithm H(x) on x. This will ensure that, if Joe attempts to alter the message by changing $\Sigma$, Ben and Stella will detect this by comparing hash values.

5. Stella sends Ben $C=(c, x, H(x))$ publicly.

6. Since Ben knows k from the initial key exchange, he performs $k_2 \oplus x_2$ ignoring the part of the string that is beyond the length of $x_2$. This process yields $\Sigma$.

According to an embodiment of the present invention, there is a tradeoff of security versus computation.

According to an embodiment, the LSA Algorithm may be implemented in several ways that have varying degrees of security that come with different levels of computational complexity, the use of which will be determined by the needs of the sender/receiver. Three such possibilities are described in this section.

1. Preforming the desired key exchange once and encrypt the entire message in the same U(n).
2. Picking a value $s \in Z$ and change k each time $\Sigma$ is divisible by s. This will require extra computation depending on the value of s.
3. Changing k for each $a^l$. This will require the most computation, but will prevent any more than one character of the encrypted message from being exposed in the event that the value of k is discovered by Joe.
4. In order to avoid giving any hint about the size of the group that can be guessed by the magnitude of $\Sigma$, the following procedure can be performed:

Let $\Omega$ be the total number of elements congruent to $-1$ modulo n that are generated by multiplying all the elements of the group in descending order. Then Stella chooses an arbitrary integer f and sends (c, $f\Omega+\Sigma$) to Ben.

Since Ben knows all the elements of the group, then he can easily derive a by multiplying all the elements of the groups one by one and check their congruence modulo n all the time, and of consequence she can find $\Sigma$ by performing $f\Omega+\Sigma \equiv \Sigma \mod \Omega$.

This procedure allows the sender to publish a very large integer that substitute $\Sigma$ even working within a very small group.

Computational Example

In this section, a walkthrough is provided of an example which incorporates a small order group, making computations manageable.

Consider the case where Stella wants to secretly share the plaintext '7' with Ben:

1. The key exchange algorithm (the Diffie-Hellman, for example) generates k=53.
2. Stella and Ben independently follow the LSA algorithm and conclude that that the next useful integer is 54 because 54 satisfies the following properties: 53<54 and 54=2·3³.
3. Stella and Ben list the elements U(54) {1,5,7,11,13,17, 19,23,25,29,31,35,37,41,43,47,49,53}.
4. Since Stella wishes to send '7', she picks the 7th element of U(54) in ascending order, which is 19. Then she performs 1·5·7·11·13·17·19=1,616,615 mod 54≡17=c.
5. Stella multiplies c by each element in descending order to find the value of in the following way:
   17·53=901 mod 54≡37
   37·42=1,813 mod 54≡31
   31·47=1,457 mod 54≡53→≡−1 mod 54→(this is one $\Sigma$)
   53·43=2,279 mod 54≡11
   11·41=451 mod 54≡19
   19·37=703 mod 54≡1
   1·35=35 mod 54≡35
   35·31=1,085 mod 54≡5
   5·29=145 mod 54≡37
   37·25=925 mod 54≡7

6. Since c=17 and there is only one $\Sigma$, then Stella publicly sends C=(17,1) to Ben (assuming that no extra steps are taken to protect the value of $\Sigma$ as listed in [0007]).
7. Ben receives C and starts to multiply c by the elements of the group in descending order until he finds $\Sigma+1$ (in this case 1+1) elements congruent to −1 mod 54 as follows:
   17·53=901 mod 54≡37
   37·42=1,813 mod 54≡31
   31·47=1,457 mod 54≡53→≡−1 mod 54→(first $\Sigma$)
   53·43=2,279 mod 54≡11
   11·41=451 mod 54≡19
   19·37=703 mod 54≡1
   1·35=35 mod 54≡35
   35·31=1,085 mod 54≡5
   5·29=145 mod 54≡37
   37·25=925 mod 54≡7
   7·23=161 mod 54≡53→(second $\Sigma$)
8. Since Ben found the second element that is congruent to −1 mod 54, he knows that all of the elements of the group have been multiplied. This tells him that the next number in the sequence is the chosen number (19). Since 19 is the 7th group element, Ben has the plaintext '7'.

The security of the LSA algorithm is derived from the fact that only Stella and Ben know k. It follows that Joe cannot calculate U(n). And, with infinite possible U(n)'s (which yields infinite possible elements to choose from), he cannot decrypt the publicly sent C=(c,$\Sigma$).

In addition to the descriptions and equations described above, the following remarks are also deemed relevant to the present invention.

1. In reference to I): If n=k, then it would weaken a point as any successful attack on n would result in the discovery of k, which in turn could be used to reveal $\Sigma$.
2. In reference to II): It is recommended that, when choosing a group U(n), n not be prime or else the product of the group elements may be a factorial and thus easily recognizable by a cryptanalyst. This can be easily ensured by setting t>1.
3. The LSA can be performed also operating within additive groups in the following way:

Let the generated key k by the key exchange algorithm be used to generate $Z_k$, where $Z_n$, with $n \in Z$ is the group of the positive integers less than in including 0, closed under addition modulo n.

Then, Stella picks an element of the group, say l, according to her needs of information sharing, and sends c≡0+1+2+ . . . +l mod k to Ben.

Ben decrypts the message by performing the same steps of Stella, meaning that he performs 0+1+2+ . . . +h until he finds that 0+1+2+ . . . h≡c mod k, thus he will know that h=l and the plaintext will be decrypted.

As in the multiplicative method, since $Z_k$ is a group, it is possible that the addition of the elements of the group will generate more than one element congruent to c modulo k, so, all of these elements will be listed as E and communicated in a tuple such as C=(c,$\Sigma$), where C will be public.

Example

The key exchange algorithm (Diffie-Hellman, for example) generates the integer 5, thus Stella and Ben list the elements of $Z_5$ in crescent order, namely <0,1,2,3,4>.

Assume that Stella wants to send Ben the integer 3; then she performs 0+1+2+3=6≡1 mod 5, thus she find that c=1. Next, she will check that
   0+1=1≡1 mod 5→(this is one $\Sigma$)
   0+1+2=3≡3 mod 5.

At this point she found the value of Σ and she sends C=(1,1) to Ben.

Ben then performs the same steps until he finds the second element congruent to 1 modulo 5, in the following way:

0+1=1≡1 mod 5→(one Σ)
0+1+2=3≡3 mod 5
0+1+2+3=6≡1 mod 5.

Thus, Ben knows that c=3 and he decrypts the ciphertext.

In addition to the above-described means of using the LSA algorithm, it is noted that the LSA algorithm may be used according to other means, including any suitable means, while maintaining the spirit of the present invention. For example, following Gauss' Generalization of Wilson's Theorem for non-cyclic group, which states that, if all the elements of U(n) are multiplied, when U(n) is not cyclic, an element congruent to 1 modulo n is generated. According to this, the LSA algorithm can be used in the following way (using the following example):

Example (a) Stella and Ben begin by performing a key exchange algorithm that generates a shared key, k∈N, that is only known to Stella and Ben and is kept secret.

(b) Next, k is used as a reference by both parties to find an n∈Z that satisfies the following properties:
  I) k<n.
  II) $n \neq p^t$ and $n \neq 2 \cdot p^t$, where p is an odd prime number and t∈N.
  III) For any β∈Z that satisfies I) and II), it must be the case that n≤β.

(c) Assuming that the above conditions have been met, then it follows that U(n) is not cyclic. At this point, Stella chooses an element, $\varepsilon_h$, such that U(n)={$\varepsilon_1$, $\varepsilon_2$, $\varepsilon_3$, ..., $\varepsilon_h$, ..., $\varepsilon_{\varphi(n)}$} where $\varepsilon_i < \varepsilon_j$ when i<j, to represent the plain text of her message.

(d) To encrypt, Stella multiplies all the elements $\varepsilon_1 \cdot \varepsilon_2 \ldots \varepsilon_h$ mod n≡c, where c is a component of the ciphertext. Then, Stella checks if $c \cdot \varepsilon_{\varphi(n)} \equiv 1$ mod n, $c \cdot \varepsilon_{\varphi(n)} \cdot \varepsilon_{\varphi(n)-1} \equiv 1$ mod n, all the way to $c \cdot \varepsilon_{\varphi(n)} \cdot \varepsilon_{\varphi(n)-1} \ldots \varepsilon_{h+1} \equiv 1$ mod n and records the number of instances where this is true. She gives this value a name, e.g., Σ, and C=(c,Σ) becomes the cyphertext.

(e) Stella publicly sends C to Ben.

(f) Since U(n) is not cyclic, Ben checks if $c \cdot \varepsilon_{\varphi(n)} \equiv 1$ mod n, $c \cdot \varepsilon_{\varphi(n)} \cdot \varepsilon_{\varphi(n)-1} \equiv 1$ mod n, all the way to $c \cdot \varepsilon_{\varphi(n)} \cdot \varepsilon_{\varphi(n)-1} \ldots \varepsilon_{h+1} \equiv 1$ mod n until he finds Σ+1 elements congruent to 1 modulo n. When $c \cdot \varepsilon_{\varphi(n)} \cdot \varepsilon_{\varphi(n)-1} \equiv 1$ mod n, Ben knows $c = \varepsilon_h$.

In addition to the above-mentioned uses of the LSA algorithm, the LSA algorithm may also be used in multiplicative groups U(n), in the following way (using the following example):

(a) Let the generated shared key, k, be used to generate U(k)=<$\varepsilon_1$, $\varepsilon_2$, $\varepsilon_3$, ..., $\varepsilon_{\varphi(n)}$>, that is the group of all the integers less then k and coprime to k, where $\varepsilon_i < \varepsilon_j$ when i<j.

(b) Stella picks an element of the group, e.g., $\varepsilon_h$, according to her needs of information sharing, and sends c to Ben, such that $\varepsilon_1 \cdot \varepsilon_2 \ldots \varepsilon_h$ mod k≡c.

(c) Ben decrypts the message by performing the same steps as Stella, meaning that he performs $\varepsilon_1 \cdot \varepsilon_2 \cdot \varepsilon_3 \ldots$ until he arrives to multiply $\varepsilon_h$ and finds that $\varepsilon_1 \cdot \varepsilon_2 \ldots \varepsilon_h$ mod k≡c, thus he will know that $\varepsilon_h$ is the plaintext.

(d) As in the additive method, since U(k) is a group, it is possible that the multiplication of the elements of the group will generate more than one element congruent to c modulo k, so, all of these elements will be listed as Σ and communicated in a tuple such as C=(c,Σ), where C will be public.

Further Example

The key exchange algorithm generates the integer 18, thus Stella and Ben list the elements of U(18) in ascending order, namely <1,5,7,11,13,17>.

Assume that Stella wants to send Ben the integer 13; then she performs 1·5·7·11·13=5005≡1 mod 18, thus she find that c=1. Next, she will check that 1≡1 mod 18→(this is one Σ)
1·5=5 mod 18
1·5·7≡17 mod 18
1·5·7·11≡7 mod 18

At this point she found the value of Σ and she sends C=(1,1) to Ben.

Ben then performs the same steps until he finds the second element congruent to 1 modulo 18, in the following way:

1≡1 mod 18→(one Σ)
1·5≡5 mod 18
1·5·7≡17 mod 18
1·5·7·11≡7 mod 18
1·5·7·11·13≡1 mod 18

So finally Ben knows that the plaintext is 13 because he found the second element congruent to 1 modulo 18.

In addition to the above-mentioned uses of the LSA algorithm, the LSA algorithm may The LSA can be used as a combination of cyclic and non-cyclic groups:

After the key exchange process, we use the Gauss' Generalization of Wilson's Theorem accordingly to the nature of the key k. This means that, if the key exchange algorithm generates k∈Z such that $k = p^t$ or $k = 2p^t$, with p be a prime number and t∈Z, then Stella and Ben will encrypt and decrypt the message accordingly to the method described for cyclic groups. If instead $k \neq p^t$ and $k \neq 2p^t$, then Stella and Ben will encrypt and decrypt accordingly to the method described for non-cyclic groups.

It is further noted that all of the variations of the LSA algorithm can be performed backwards, just by listing the elements in all the variation in descending order and then proceeding as described in each case.

Figure 2:
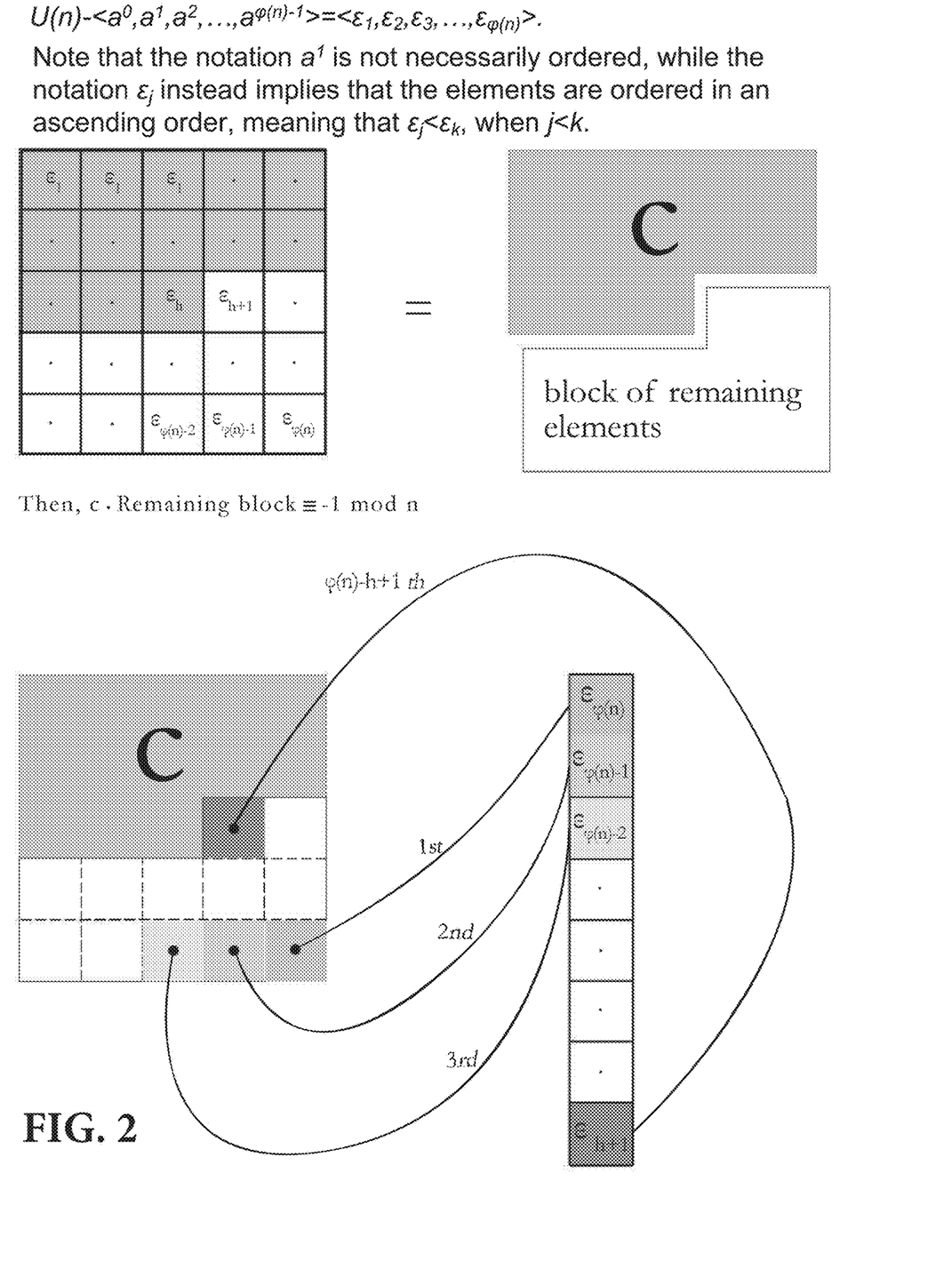
FIG. 2 shows a visual representation of a multiplicative group used to encrypt symbols, according to an embodiment of the present invention.

FIG. 2 provides a visual aid to the multiplicative group used to encrypt symbols. According to an embodiment, each individual block in FIG. 2 represents a single element. The shaded area of each block represents the elements multiplied together by the sender of the message, beginning at $\epsilon_1$ and continuing through $\epsilon_h$, where $\epsilon_h$ corresponds to the to the pain text symbol.

The unshaded area represents the group elements to be multiplied by the receiver of the ciphertext, beginning at the largest group element, $\epsilon_{\varphi(n)}$, and working backwards (multiplied in decreasing order) until the element that is congruent to −1 modulo n is found. When the receiver has done this Σ+1 times, the plaintext is revealed.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method of asymmetrical encryption and transferring encrypted data, the method comprising:
  generating an encryption key represented by $k \in Z$;
  calculating an n that satisfies the following properties:
  i) $k<n$;
  ii) $n=p^t$, $n=2 \cdot p^t$ where p is an odd prime number and $t \in Z$ is a non-negative integer; and
  iii) For any $\beta \in Z$ that satisfies I) and II) it must be the case that $n \leq \beta$, wherein, if these properties have been met, $U(n)$ is defined as a cyclic group of all integers relatively prime to n and less than n, and wherein $U(n)$ is cyclic and $U(n)=<a>=\{a^0, a^1, a^2, \ldots, a^{\varphi(n)-1}\}$;
  choosing an element, $a^l$, with $0 \leq l \leq \varphi(n)-1$ such that $U(n)=<a>=\{a^0, a^1, a^2, \ldots, a^{\varphi(n)-1}\}=\{\varepsilon_1, \varepsilon_2, \varepsilon_3, \ldots, \varepsilon_h, \ldots \varepsilon_{\varphi(n)}\}$, wherein $\varepsilon_i<\varepsilon_j$ when $i<j$, to represent a plaintext of a selection of data, and wherein $a^l=\varepsilon_h$;
  encrypting the selection of data by performing the following steps:
   a) multiplying all elements $\varepsilon_1 \cdot \varepsilon_2 \ldots \varepsilon_h \mod n \equiv c$, where c is a component of a ciphertext;
   b) analyzing data to determine when $c \cdot \varepsilon_{\varphi(n)} \equiv -1 \mod n$, $c \cdot \varepsilon_{\varphi(n)} \cdot \varepsilon_{\varphi(n)-1} \equiv -1 \mod n$, all the way to $c \cdot \varepsilon_{(\varphi(n))} \cdot \varepsilon_{\varphi(n)-1} \ldots \varepsilon_{h+1} \equiv -1 \mod n$;
   c) recording a number of instances where step a) is true, wherein the number of instances is defined as $\Sigma$; and
   d) generating a ciphertext, defined as C, wherein $C=(c, \Sigma)$;
  sending C to one or more third parties over a network; and
  decrypting, by the one or more third parties, the ciphertext using the encryption key.

2. The method as recited in claim 1, wherein the encrypting includes encrypting on an electronic device having at least one process and at least one memory.

3. The method as recited in claim 2, wherein the electronic device is selected from the group consisting of: a desktop computer; a laptop computer; a smartphone; a tablet computer; and an automated teller machine.

* * * * *